(12) United States Patent
Suchy et al.

(10) Patent No.: US 8,485,472 B2
(45) Date of Patent: Jul. 16, 2013

(54) SEALING OF AIRFLOW BETWEEN A WING AND A FUSELAGE

(75) Inventors: Rainer Suchy, Donauworth (DE); Anton Lewold, Syrgenstein (DE)

(73) Assignee: Eurocopter Deutschland GmbH, Donauworth (DE)

( * ) Notice: Subject to any disclaimer, the term of this patent is extended or adjusted under 35 U.S.C. 154(b) by 256 days.

(21) Appl. No.: 12/896,138

(22) Filed: Oct. 1, 2010

(65) Prior Publication Data
US 2011/0147525 A1  Jun. 23, 2011

(30) Foreign Application Priority Data
Dec. 21, 2009 (EP) .................................. 09400061

(51) Int. Cl.
*B64C 1/38* (2006.01)
(52) U.S. Cl.
USPC .......................................... 244/130; 244/131
(58) Field of Classification Search
USPC ................................................. 244/130, 131
See application file for complete search history.

(56) References Cited

U.S. PATENT DOCUMENTS

| | | | | |
|---|---|---|---|---|
| 3,499,622 A * | 3/1970 | Surcin et al. | .................. | 244/130 |
| 6,581,877 B2 * | 6/2003 | Pauly | ............................ | 244/131 |
| 6,655,635 B2 * | 12/2003 | Maury et al. | ................... | 244/131 |
| 7,607,614 B2 * | 10/2009 | Rouyre | ......................... | 244/131 |
| 8,177,167 B2 * | 5/2012 | Meyer | ............................ | 244/119 |
| 8,177,170 B2 * | 5/2012 | Fol et al. | ....................... | 244/130 |
| 2003/0006344 A1 * | 1/2003 | Pauly | ............................ | 244/130 |
| 2003/0066933 A1 * | 4/2003 | Maury et al. | .................. | 244/130 |
| 2005/0247821 A1 * | 11/2005 | Rouyre | ..................... | 244/129.1 |
| 2009/0078830 A1 * | 3/2009 | Fol et al. | ....................... | 244/200 |
| 2010/0170987 A1 * | 7/2010 | Meyer | ............................ | 244/120 |
| 2010/0243810 A1 * | 9/2010 | Lobo Barros et al. | ........ | 244/131 |
| 2011/0204185 A1 * | 8/2011 | Lyons | ............................ | 244/130 |

FOREIGN PATENT DOCUMENTS

| | | |
|---|---|---|
| DE | 694021 C | 7/1940 |
| FR | 2789144 A1 | 8/2000 |

OTHER PUBLICATIONS

International Search Report; Application No. EP 09 40 0061; dated May 21, 2010.

* cited by examiner

*Primary Examiner* — Tien Dinh
*Assistant Examiner* — Steven Hawk
(74) *Attorney, Agent, or Firm* — Brooks Kushman P.C.

(57) ABSTRACT

A sealing (1) for a fairing (2) against transverse airflow between a wing (3) and a fuselage (4) of an aircraft. Inner and outer sides (7, 8) of the sealing (1) are provided with lips biased against the fairing (2) and the wing (3). At least two gaskets (5, 6) are positioned between respective ends of the sides (7, 8), thus sealing the fairing (2) and the wing (3) against longitudinal airflow.

6 Claims, 2 Drawing Sheets

SEALING OF AIRFLOW BETWEEN A WING AND A FUSELAGE

CROSS-REFERENCE TO RELATED APPLICATIONS

This application claims the benefit of European patent application no. 09 400061.9 dated Dec. 21, 2009, the disclosure of which is incorporated herein by reference.

FIELD OF THE INVENTION

The present invention relates to a sealing of airflow for a fairing between a wing and a fuselage of an aircraft.

The invention pertains to the aircraft field. In particular, the invention relates to a sealing for a fairing between a wing structure and the fuselage of the aircraft.

BACKGROUND OF THE INVENTION

Aircraft are conventionally provided with fairings, namely fairings fixed to the intersection of the fuselage with the wing structure. The fairings may be combined with seals provided to prohibit the circulation of air inside the fairing as an air passage of this kind could prompt a vibration of the seal. This vibration may create a noise that is audible inside the cabin of the aircraft, thus creating auditory discomfort for occupants of the cabin. Furthermore, this vibration is transmitted to the fuselage and to the elements that it comprises, giving rise to structural stress and fatigue in those elements. Furthermore, the vibration of the seal favors a wearing out of the seal and the wearing out may lead to a premature tearing of the seal. Finally, this vibration gives rise to parasitic aerodynamic drag.

The document DE 694 021 C discloses a lining for a gap of an airplane.

The document FR 2 789 144 A1 discloses a seal with fittings enclosing a framework said framework extending beyond the fittings.

The document US 2003066933 A1 discloses an aircraft with ventral fairing and seal for such an aircraft. A seal is disposed in slots between said ventral fairing on the one hand and the fuselage or flying surface on the other hand, said seal being provided with an end lip and with a radially elastic bead, which are able to be applied with leaktightness against said fuselage or said flying surface, respectively.

US 2005/0247821 A1 discloses a seal positioned on an inner rim of an opening between an internal wall bordering the opening and a wing crossing said opening in order to prohibit the circulation of air inside a ventral fairing through the opening. In order to enable sealing between the external and the interior of a ventral fairing US 2005/0247821 A1 proposes a transition shim between the structure fastening the wing to the fuselage of the aircraft and the wing. A shim for a ventral fairing is not suitable for example for an upper-wing fairing. A shim causes extra efforts and costs for the construction and an increase of the total weight of the aircraft.

SUMMARY OF THE INVENTION

It is an objective of the present invention to provide a sealing against longitudinal airflow for a fairing between a wing and a fuselage of an aircraft without the disadvantages of the prior art.

A solution is provided with a sealing for a fairing against airflow between a wing and a fuselage of an aircraft. In one embodiment, the sealing is used for a fairing that faces transverse air flow between a wing and a fuselage of an aircraft. Inner and outer sides of the sealing are provided with lips that are biased against the fairing. In one embodiment, the wing has at least two gaskets between respective ends of the sides sealing the fairing and the wing against longitudinal air flow.

According to one aspect of the invention, a sealing against transverse airflow is provided for a fairing between a wing and a fuselage of an aircraft. The sealing has an outer and an inner side with lips biased against the wing. There are at least two soft rubber lips between respective ends of the sides of the sealing against longitudinal airflow along the fairing between the wing and the fuselage. The advantages of the double lips include (1) a predictable connection between the wing and the fuselage; (2) strong sealing against transverse airflow between the wing and the fuselage; and (3) strong sealing against longitudinal airflow inside the sealing, along the fairing between the wing and the fuselage, even when the wing is bent down excessively relative to its normal position towards the fuselage. This avoids vibrations and the sounds produced by such vibrations, avoiding wear of the inventive sealing and additional air drag for the aircraft.

According to a preferred embodiment of the invention the gaskets are conceived as soft rubber lips for improved flexibility and better adaption.

According to another preferred embodiment of the invention the two relaxed gaskets assume a rather convex shape, but have a less convex—a rather flat shape—with the opposed sides being bent more open in a mounted position. This position obstructs efficiently any possible passage for longitudinal airflow along the sides of the sealing.

BRIEF DESCRIPTION OF THE DRAWINGS

A preferred example of the invention is given by way of a non-limiting embodiment as presented in the attached drawings.

DETAILED DESCRIPTION OF THE PREFERRED EMBODIMENT

Figure 1:
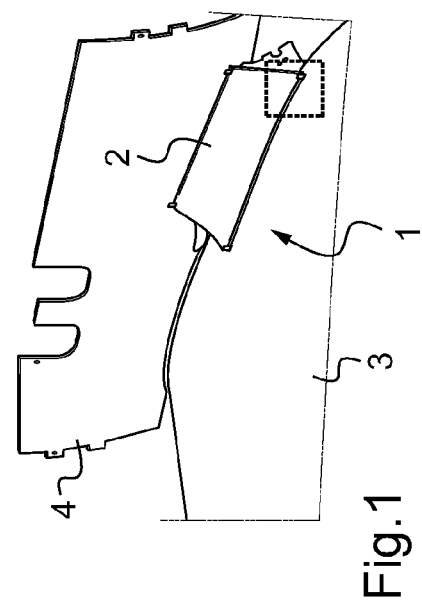
FIG. 1 is a perspective view of a sealing of a fairing between a wing and a fuselage of an aircraft according to one embodiment of the invention.

FIG. 1 depicts a sealing 1 against transverse airflow. The sealing 1 is mounted at a lower rim of a fairing 2 between a wing 3 and a fuselage 4 of an aircraft (not shown).

Figure 2:
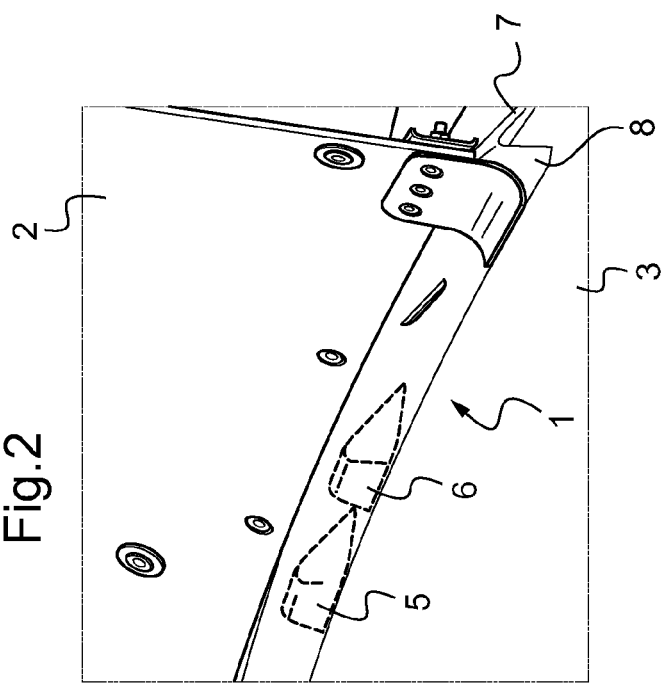
FIG. 2 is an enlarged section of the perspective view of FIG. 1.

FIG. 2 has corresponding features that have the references used in FIG. 1. The sealing 1 is provided with two gaskets 5, 6, such as soft rubber lips, between respective ends of inner and outer sides 7, 8 of the sealing 1 against longitudinal airflow along the fairing 2 between the wing 3 and the fuselage 4 of the aircraft.

Figure 3:
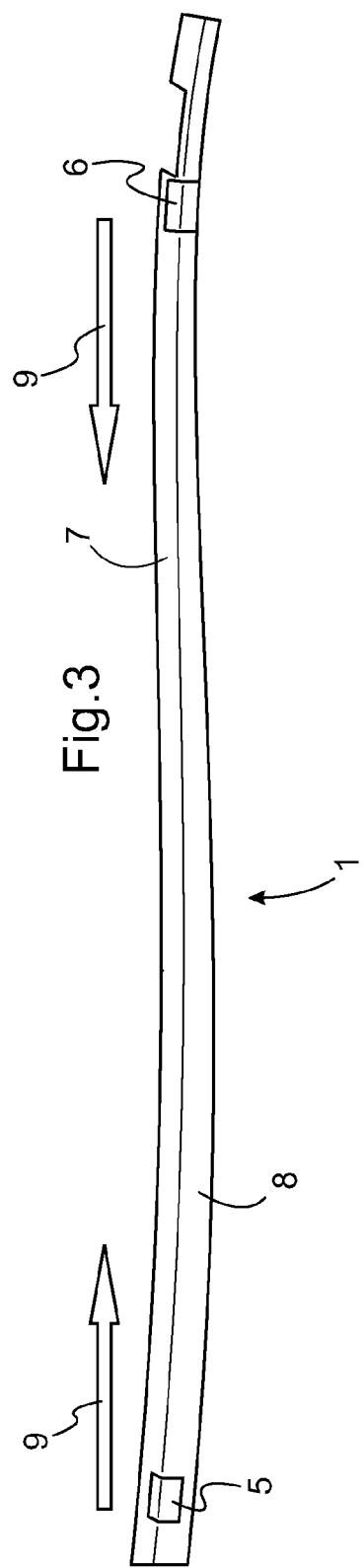
FIG. 3 is a bottom view of a sealing between a wing and a fuselage of an aircraft.

FIG. 3 also has corresponding features that have the references used in FIGS. 1 and 2. The outer side 8 of the sealing 1 is mounted against the wing 3. The option of longitudinal airflow through the sealing 1 and the wing 3 is indicated by arrows 9.

Figure 4:
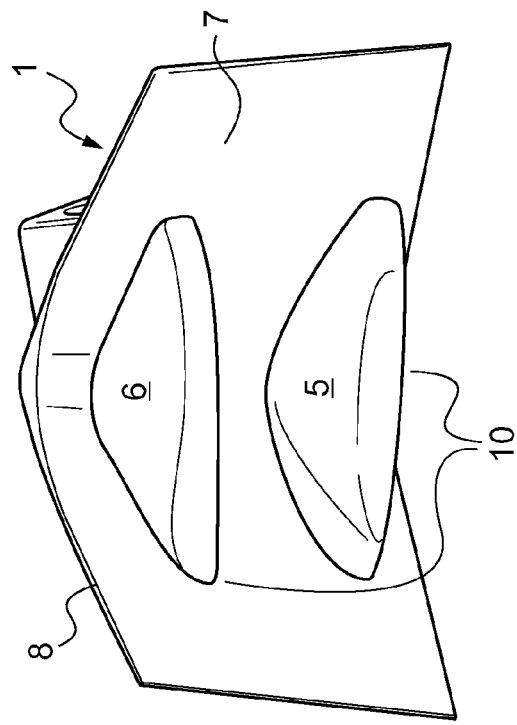
FIG. 4 is a perspective view of a sealing according to one embodiment of the invention.
Figure 5:
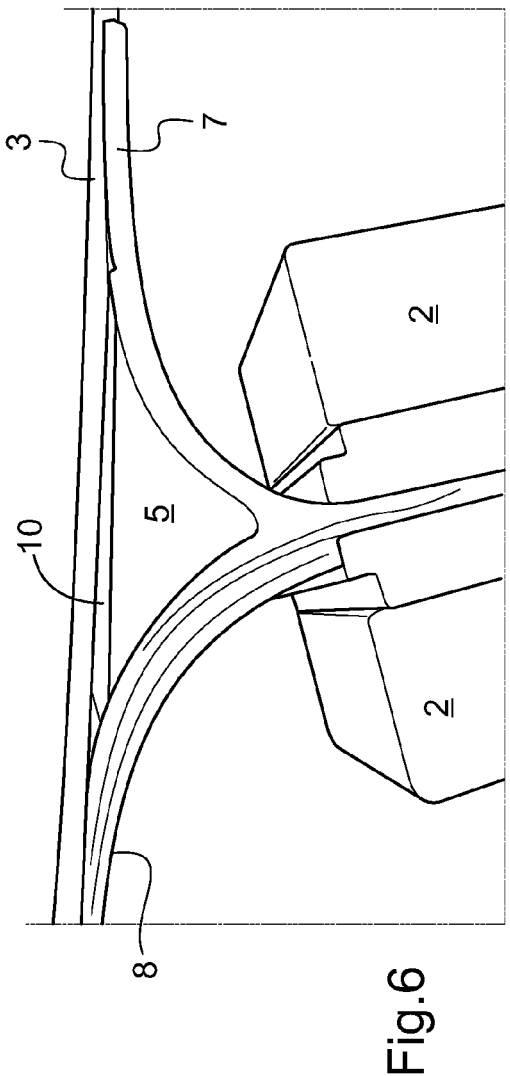
FIG. 5 is a further perspective view of a sealing according to one embodiment of the invention.

In FIGS. 4 and 5, the sealing 1 is equipped with two gaskets 5, 6 that are integral with the opposed inner and outer sides 7, 8 of the sealing 1. The gaskets 5, 6 each have a free edge 10. In a relaxed position of the sealing 1 (FIG. 4) the two gaskets 5, 6 have a convex shape. But the two gaskets 5, 6 have a less convex—instead a rather flat shape (FIG. 5)—with the opposed sides 7, 8 being bent more open if the sealing 1 is in a mounted position.

Figure 6:
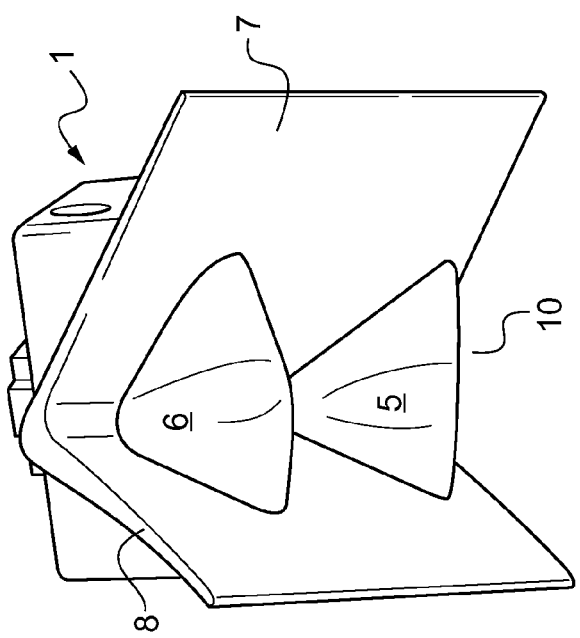
FIG. 6 is a further perspective view of a sealing mounted between a wing and a fuselage of an aircraft according to one embodiment of the invention.

FIG. 6 has corresponding features that have the references used in FIGS. 1-5. If the sealing 1 is pressed against a structure like a panel of wing 3, the opposed sides 7, 8 of the sealing 1 are bent open. This stretches the gasket 5 and gasket 6 (not shown) from the rather convex shape to the less convex but rather flat shape between the inner and outer sides 7, 8. As a result, the free edge 10 of the gasket 5 and the free edge 10 (not shown) of the gasket 6 (not shown) are biased against the panel of the wing 3 in order to obstruct longitudinal airflow.

What is claimed is:

1. A sealing against transverse airflow for a fairing positioned between a wing and a fuselage of an aircraft, the sealing comprising:
    a. an inner and outer side, the inner side being a first projection and the outer side being a second projection, the inner and outer sides configured to be biased against the wing to form a channel between the sealing of the fairing and the wing; and
    b. at least two gaskets positioned between fore and aft ends of the inner and outer sides and across the channel, the at least two gaskets sealing the channel against longitudinal airflow when biased against the wing.

2. A sealing according to claim 1, wherein the at least two gaskets include soft rubber lips.

3. A sealing according to claim 1, wherein the at least two gaskets include in a relaxed position a convex shape and in a mounted position a less convex, flatter shape with opposed sides being bent more open than in the relaxed position.

4. A sealing against transverse airflow for a fairing positioned between a wing and a fuselage of an aircraft, the sealing comprising:
    a body having a first projection and a second projection defining a channel therebetween, the body adapted for connection to the fairing, the first and second projections configured to be biased against the wing; and
    a first and second gasket, each gasket extending across the channel from an inner surface of the first projection to an inner surface of the second projection and having a free edge therebetween, the first gasket spaced apart from the second gasket along a longitudinal axis of the sealing, wherein the free edge of each gasket is configured to contact the wing to reduce longitudinal airflow through the channel of the sealing.

5. The sealing of claim 4, wherein each gasket has a relaxed position with convex shape and a mounted position with a less convex, flatter shape than the relaxed position.

6. The sealing of claim 5, wherein the first and second projections are bent more open in the mounted position compared to the relaxed position.

* * * * *